United States Patent [19]
Jensen

[11] Patent Number: 6,124,656
[45] Date of Patent: Sep. 26, 2000

[54] STAINLESS STEEL CAP

[75] Inventor: Jan Jensen, Hvidovre, Denmark

[73] Assignee: Interroll Holding AG, San Antonio/Ti, China

[21] Appl. No.: 09/171,014

[22] PCT Filed: Apr. 10, 1997

[86] PCT No.: PCT/EP97/01802

§ 371 Date: Aug. 6, 1999

§ 102(e) Date: Aug. 6, 1999

[87] PCT Pub. No.: WO97/37913

PCT Pub. Date: Oct. 16, 1997

[30] Foreign Application Priority Data

Apr. 11, 1996 [DK] Denmark ............................ 96 00125

[51] Int. Cl.[7] ................................................ H02K 5/00
[52] U.S. Cl. .......................... 310/89; 310/42; 310/45; 310/90; 310/87; 310/85
[58] Field of Search .................... 310/89, 42, 45, 310/90, 87, 85; 198/842

[56] References Cited

U.S. PATENT DOCUMENTS

| | | | |
|---|---|---|---|
| 3,766,416 | 10/1973 | Papst et al. | 310/43 |
| 4,267,477 | 5/1981 | Faulhaber | 310/266 |
| 4,873,461 | 10/1989 | Brennan et al. | 310/47 |
| 4,999,533 | 3/1991 | King et al. | 310/90 |
| 5,079,464 | 1/1992 | King et al. | 310/89 |
| 5,917,258 | 6/1999 | Kershaw et al. | 310/51 |
| 5,969,447 | 10/1999 | Periyathamby et al. | 310/89 |
| 5,977,666 | 11/1999 | Horski et al. | 310/51 |

*Primary Examiner*—Nestor Ramirez
*Assistant Examiner*—Thanh Lam
*Attorney, Agent, or Firm*—Emerson & Associares; Roger D. Emerson; Timothy D. Bennett

[57] ABSTRACT

The invention relates to an electrically driven drum motor 1 comprising a substantially cylindrical drum 2 of noncorroding material, especially in the form of an electrically driven conveyer roller, said drum 2 having annular end edges 12 and being connected with two circular end caps 14, 15 to define, together with these, an internal space to receive an electric motor 7, said end caps 14, 15 being provided with a central opening 18 for a rigid shaft 6 for the drum motor 1, which is characterized in that each end cap 14, 15 is firmly connected with an external, separate jacket 30 of noncorroding material, especially stainless steel or plastic, said jacket 30 having a central opening 31 for the rigid shaft (6) of the drum motor, and said jacket 30 being formed as a circular disc of a relatively thin plate which is formed integrally with a peripheral flange 35, said flange 35 being formed to tightly engage an end edge 12 of the cylindrical drum 2 and to form a smooth transition to the external surface of the cylindrical drum 2.

18 Claims, 5 Drawing Sheets

STAINLESS STEEL CAP

BACKGROUND OF THE INVENTION

The present invention relates to a drum motor of the type defined in the introductory portion of claim 1.

1. Field of the Invention

The invention thus relates to an electrically driven drum motor comprising a substantially cylindrical drum of stainless steel, said drum having annular end edges and being connected to two circular end caps to define, together with these, an internal space to receive an electric motor, said end caps being provided with a central opening for a rigid shaft for the drum motor.

2. Description of the Related Art

Drum motors of this type are frequently used in connection with conveyor systems, in particular for driving a conveyor belt of e.g. rubber which directly engages the cylindrical drum.

In this connection, the drum motor is mounted on a support frame by means of the rigid shaft which extends through the interior of the drum motor and out through the opening in each end cap. The wires for feeding electrical power to the motor are usually run either axially or radially into the shaft at the outer side of one of the end caps.

With the drum motor placed correctly on the support frame, the conveyor belt of the conveyor system is mounted, engaging at least a part of the surface of the cylindrical drum and being driven forwards when the drum rotates with respect to the rigid shaft.

In certain applications of such conveyor systems, special requirements are made with respect to the hygienic conditions which must prevail at the location of use. This is the case in the food industry in particular, where it must be ensured at all times that there is a minimum risk of contamination of the processed products. In these cases, special consideration must be given to the structure of the drum motor to avoid areas on the surface which may be difficult to clean, and which may therefore cause contamination.

In the construction of drum motors for use in the food industry, particularly in the meat industry, it has been found to be of further importance that the material of all the surfaces which come into contact with the food products have such properties that they do not per se contribute to contamination of the food products. However, until now it has not been possible to allow for this while ensuring a profitable production of the drum motors at a competitive price.

SUMMARY OF THE INVENTION

The U.S. Pat. No. 5,442,248, for example, shows a drum motor which comprises a generally cylindrical drum which is rotatably mounted on a stationary roller shaft by flanged endcaps. The endcaps are press fitted into respective ends of the drum. The endcaps include central hubs which contain bearings and seals. In such a drum motor it is very difficult and expensive to provide endcaps which can prevent any contamination of products coming into contact with the drum motor.

It is the object of the invention to provide an improved drum motor which can securely prevent any contamination of products coming into contact with the drum motor and which allows a cost effective manufacturing.

This object is achieved by a drum motor having the features disclosed in claim 1. Preferred embodiments are defined in the subclaims.

The present invention satisfies the modern hygiene requirements, while still making it possible to manufacture a drum motor at a competitive price. The drum motor is thus characterized in that each end cap is firmly connected with an external, separate jacket of noncorrodating material, for example stainless steel or plastic, said jacket having a central opening for the rigid shaft of the drum motor, said jacket being formed as a circular disc of a relatively thin plate which is formed integrally with a peripheral flange, said flange being formed to tightly engage an end edge of the cylindrical drum and to form a smooth transition to the external surface of the cylindrical drum.

When the jacket, which consists of the disc part and the flange, is for example formed of stainless steel as a whole, the resulting structure of the drum motor fulfils both the strength requirements of the end caps and the intent to make the external surfaces of a material easy to clean and which cannot contribute to contaminating the food products. It should be noted here that an alternative production of the relatively strongly dimensioned end caps in stainless steel would result in prohibitively high costs of production.

The invention ensures that the end caps can still be made of a relatively inexpensive material, such as e.g. ordinary steel or preferably aluminium or plastic with the required strength. With just a slight increase in the price of the motor, the invention makes it possible to satisfy the hygiene requirements by means of the jacket of the desired material. The outer surfaces of the drum motor are thus made of noncorroding material, for example stainless steel.

It should be noted in this connection that the relatively strongly dimensioned, circular end caps contribute to the cylindrical shape of the drum, which is frequently made of a thin plate of stainless steel, and thereby to ensuring the smooth transition to the flange of the jacket.

Advantageous embodiments are defined in the dependent claims.

Thus, each end cap preferably has an annular projection which engages a portion of the associated end edge of the cylindrical drum, and which puts a limit as to how far the end caps can be inserted into the drum. The flanges of the jackets are preferably made by deep-drawing from a plane disc of stainless steel.

Furthermore, the jackets are preferably applied to the end caps as a press fit and secured by additional securing means such as gluing, said securing means providing a tight connection between the jackets and the end caps.

Finally, the dimensions of the end jackets, the end caps and the cylindrical drum are preferably so adapted as to provide the smooth transition, thereby obviating projecting edges or the like on the surface on which impurities may accumulate.

BRIEF DESCRIPTION OF THE DRAWING

The invention will be described more fully with reference to the drawing which shows a preferred embodiment.

DETAILED DESCRIPTION OF THE INVENTION

Figure 1:
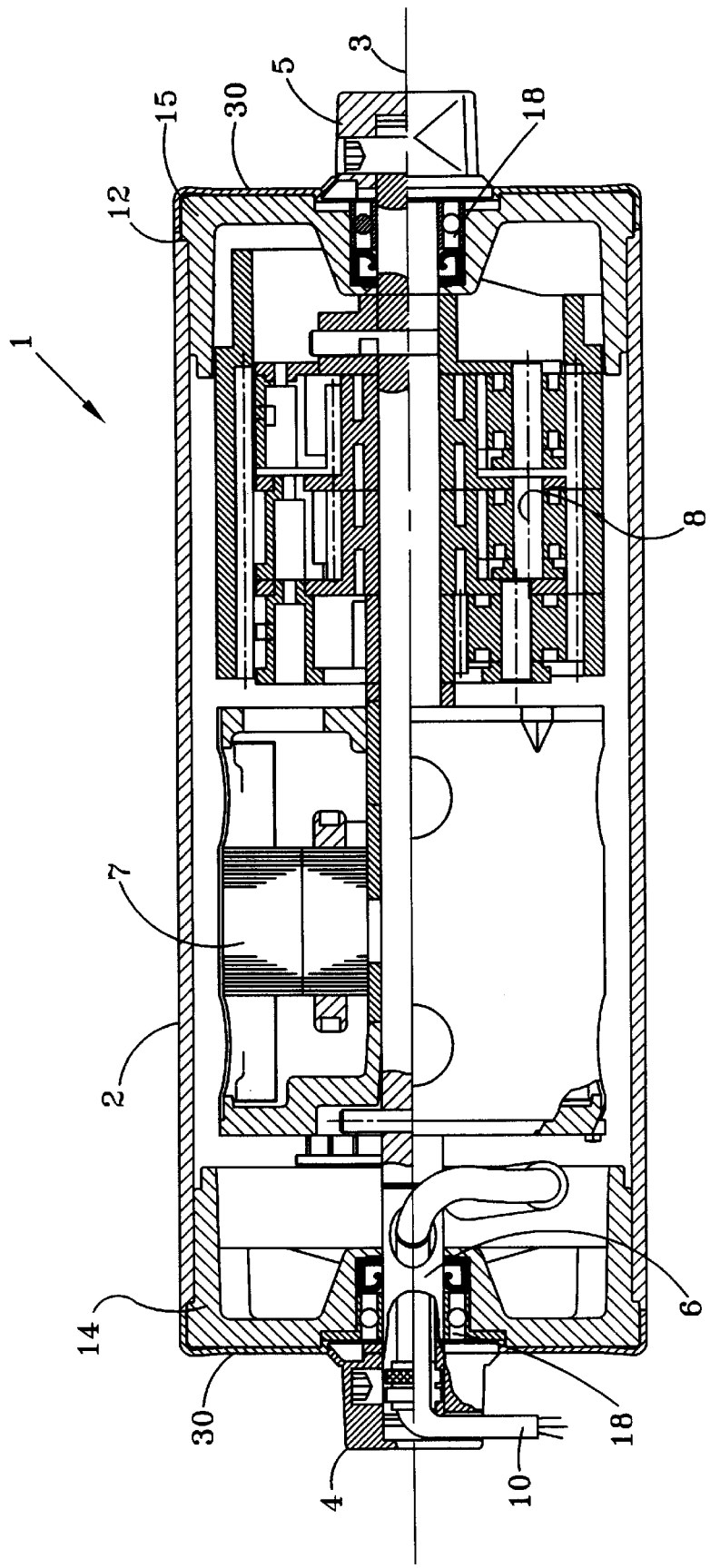
FIG. 1 is a lateral sectional view of a drum motor of the invention.

FIG. 1 shows an electrically driven drum motor 1 of the invention intended for use in a conveyor system for driving a conveyor belt, which may be made of rubber or preferably of a plastics material, such as PVC. The drum motor 1 comprises a cylindrical drum 2 which is made of a plate material of stainless steel, and which is adapted to rotate about a central axis 3, which is firm. The cylindrical drum 2 has an external surface forming part of the engagement face of the conveyor belt, which is not shown in detail in the drawing, but which preferably, but not necessarily, engages the drum motor 1 over its entire longitudinal extent. The cylindrical drum 2 is terminated at each end with plane end edges 12 which extend perpendicularly to the surface of the drum.

The interior of the cylindrical drum 2 accommodates a through shaft 6, an electric motor 7 and transmission means 8. The transmission means 8 transfer the rotary movement of the electric motor 7 to the drum 2, and the shaft 6 itself comprises a bore for an electrical wire 1 0 for the supply of power to the electric motor. These parts of the drum motor 1 will not be described in more detail.

As also appears from FIG. 1, the drum motor 1 is terminated at each end by a circular end cap 14, 15 having a through opening 18 for the shaft 6. The end caps 14, 15 are preferably made of aluminium and are dimensioned and constructed to transfer the forces which act between the shaft 6 and the drum 2, and to allow mounting of firm end members 4, 5 which are secured to the shaft 6. These end members 4, 5 comprise the bearing parts of the drum motor 1. In addition, the drum motor 1 is provided with a jacket 30 of stainless steel at each end according to the invention. This jacket 30 will be described more fully below with reference to FIGS. 3 and 4. As appears from the drawing, and for reasons which will be explained more fully below, the drum motor 1 has a smooth, external surface over its entire cylindrical-part, and thus no projecting parts which may cause accumulation of impurities on the surface.

Figure 2A:
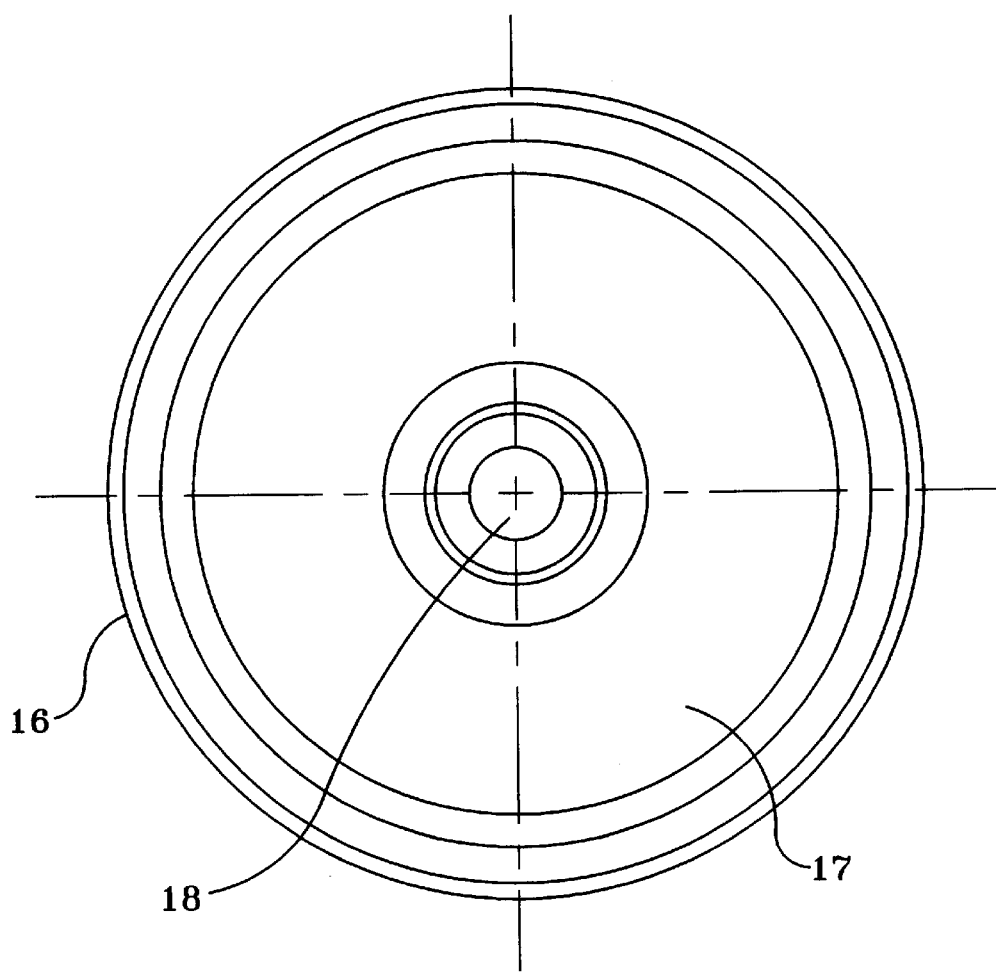
FIG. 2a is an enlarged end view of the end cap of FIG. 1.
Figure 2:
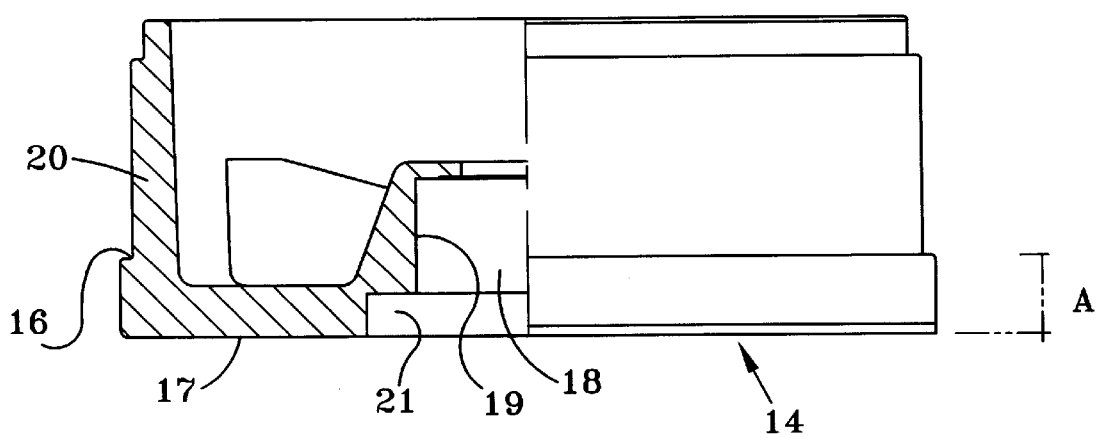
FIG. 2 is a partially sectional lateral view of the end cap of FIG. 1.

FIG. 2 shows an end cap 14, 15 in enlarged view. As shown, the end caps are formed with a circular end wall 17 formed integrally with an annular wall 20 which is provided with an annular projection 16 on its external surface. The end wall 17 is provided with a central wall 19 which partly defines the central opening 18 for the shaft 6 in which opening 18 the end members 4, 5 may be received. The end cap 14, 15 is provided with a recess 21 for the jacket 30.

Figure 3A:
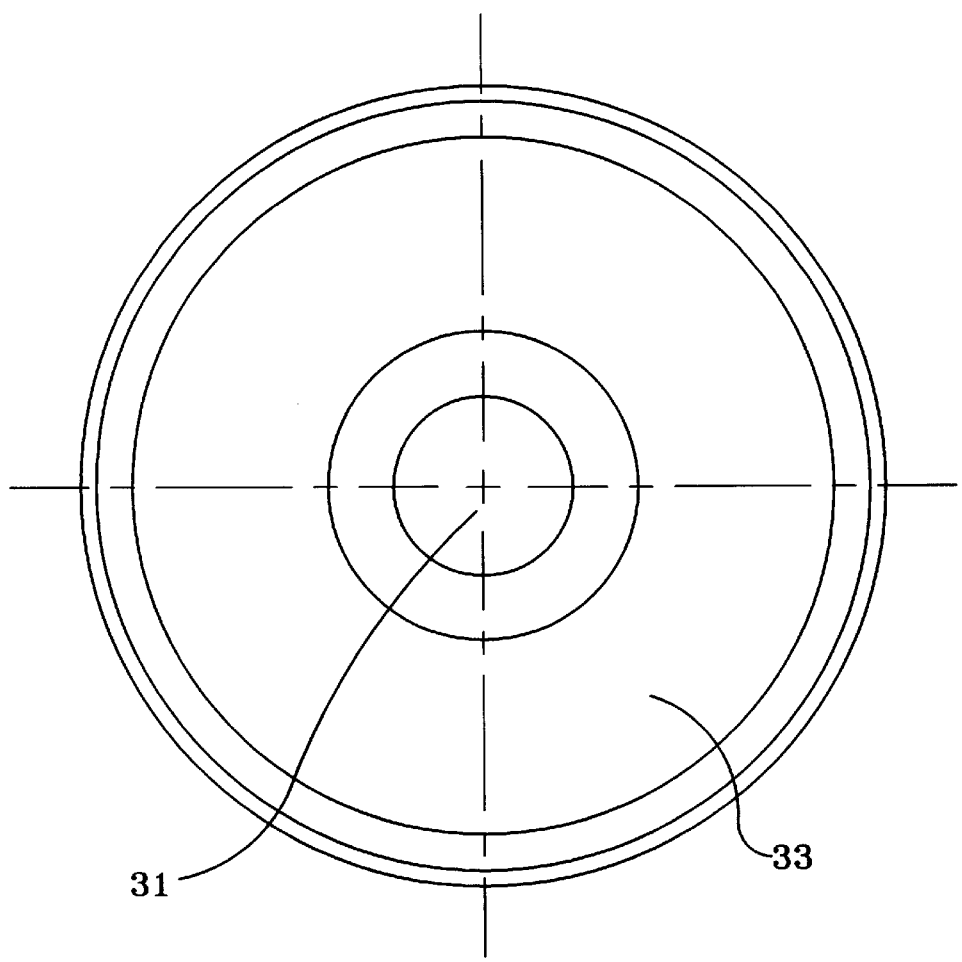
FIG. 3a is an enlarged end view of the jacket of FIG. 1.
Figure 3:
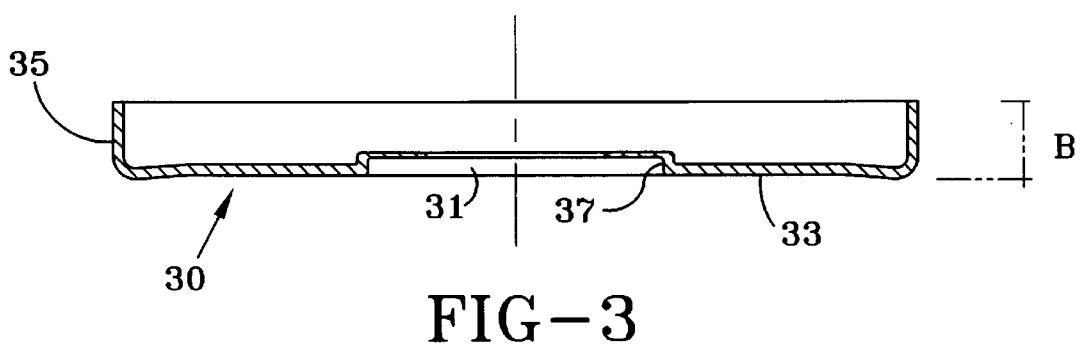
FIG. 3 is a partially sectional lateral view of the jacket of FIG. 1.

FIG. 3 shows the jacket 30 in greater detail. As mentioned, the jacket comprises an annular flange 35. The flange 35 is preferably formed by deep-drawing from a circular disc, thereby causing the flange 35 to extend perpendicularly to the main plane of the disc to form a substantially flat cap part 33, which may engage the end wall of the end cap 14, 15, and which is provided with a central opening 31 for the shaft 6. The flange 35 itself has an internal width "B" which closely corresponds to the width "A" of the end wall of the end cap 14, 15, i.e. the distance between the end face 17 of the end cap 14, 15 and the annular projection 16. The area at the central opening 31 may optionally be provided with an annular shoulder 37 which is moved into the recess 21 in the end cap 14, 15 during the assembly of the drum motor 1.

Figure 4:
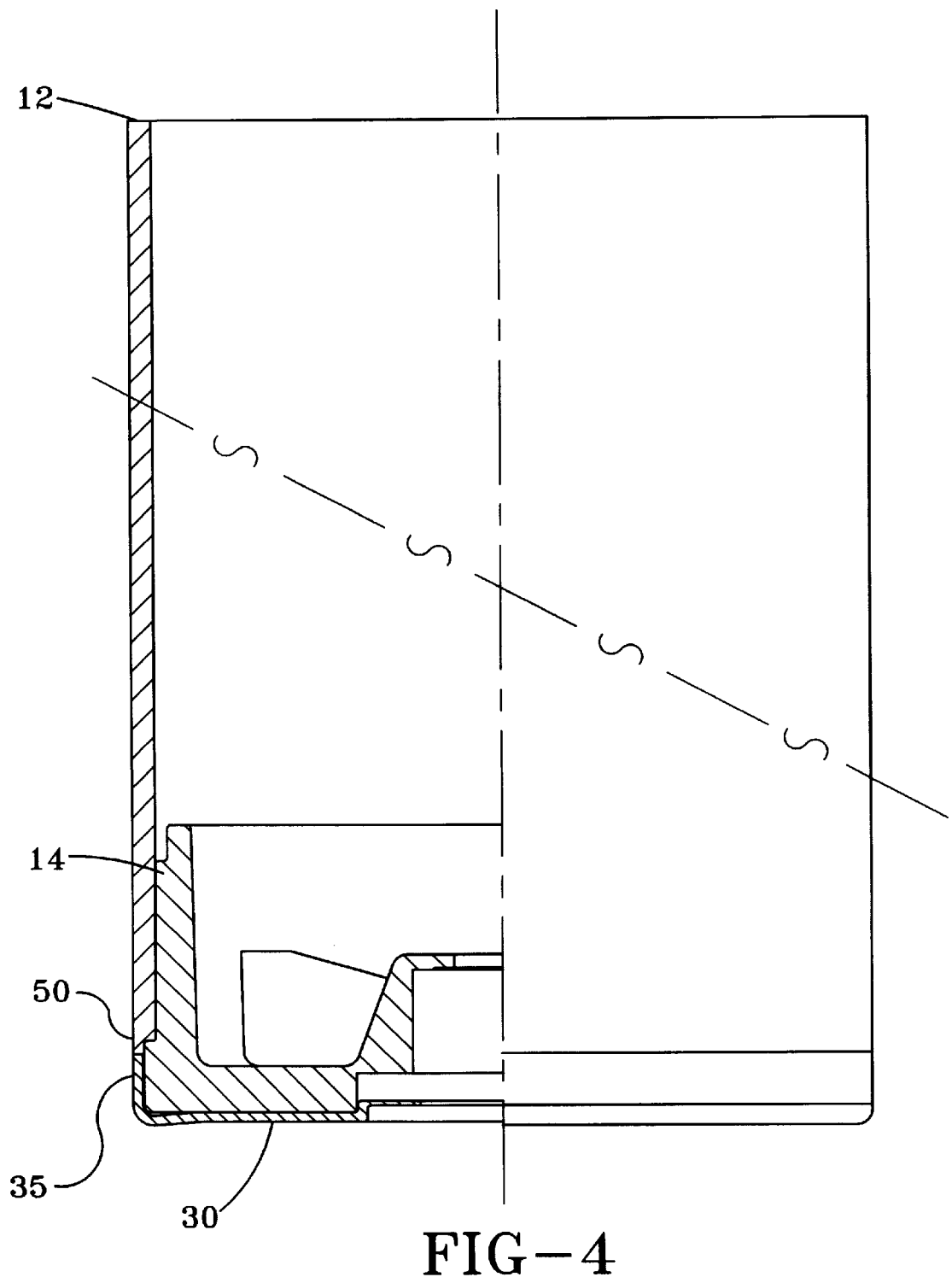
FIG. 4 is a partially sectional, enlarged view through an end portion of the drum motor of FIG. 1.

The actual connection between the drum 1, an end cap 14 and a jacket 30 is shown in FIG. 4, in which the drum 1 is shown with an opposite, free end edge 12. The end caps 14, 15 comprise an external, annular projection or a shoulder 16, as mentioned. During the assembly of the drum motor 1 the end cap 14 is moved so far into the cylindrical drum 2 that the respective end edge 12 engages the projection 16. As will be appreciated, an internal space is defined hereby, capable of accommodating the electric motor 7 and the transmission means 8. Thus, the projection 16 expediently forms a stop which limits the insertion of the end cap 14 into the drum 2. In this state, the annular wall 20 of the end caps 14, 15 tightly engages the internal surface of the drum 2, and these surfaces are firmly connected with each other so that the rotation of the drum is transmitted to the end caps 14, 15. According to the invention, the jacket 30, which may be applied to the end cap 14 either before or after the insertion of the end cap 14 into the drum 2, is preferably constructed such that that it may be applied to the end cap 14, 15 as a press fit, the attachment and the seal being provided by gluing.

As shown clearly in FIG. 4, the plate material of the drum 2 has such a thickness at the end caps 14, 15 that the drum with its end edges 12 protrude above the annular projection 16 corresponding e.g. to half the thickness of the plate material. An engagement edge 50 is provided hereby for the flange 35 of the jacket 30. Since the flange 35 has a wall thickness corresponding to the height of this engagement edge 50, a smooth transition is ensured between the jacket 30 and the external surface of the cylindrical drum 2.

Figure 5:
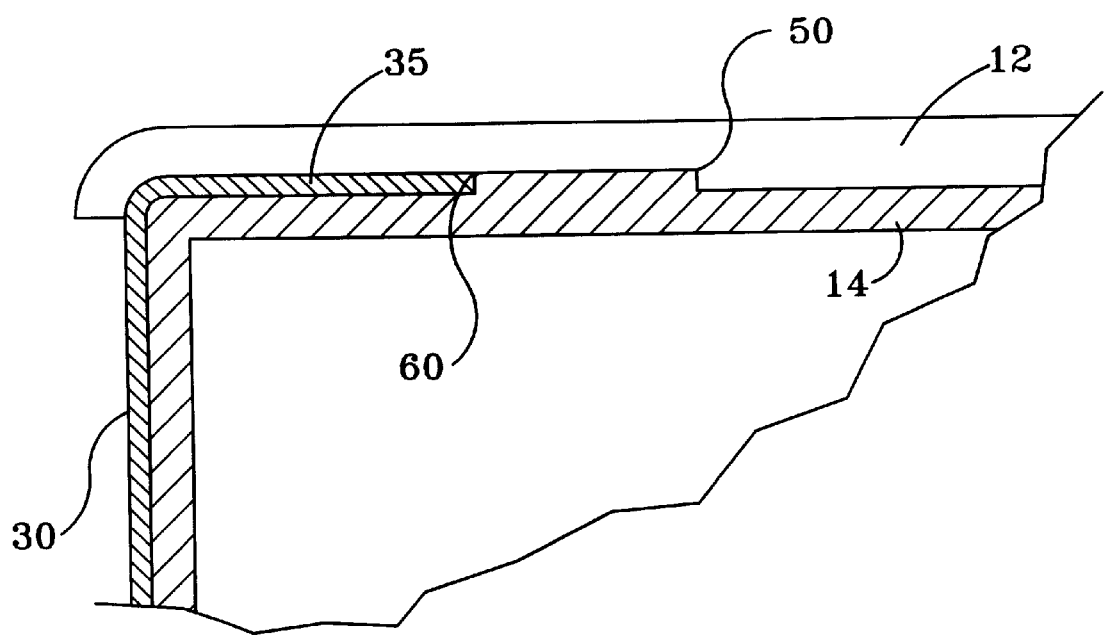
FIG. 5 is a lateral sectional view of an alternative embodiment.

In an alternative embodiment according to FIG. 5 the free end edge 12 of the drum 2 extends the engagement edge 50 of the end cap 14 overlapping the flange 35 of the jacket 30. The free end edge 12 shows a smaller inner diameter to create a stopping position for the engagement edge 50. The engagement edge 50 is thereby provided by an annular ring. The opposite edge of the ring is another engagement edge 60 for the jacket 30. As the outer diameter of the end cap 14 is less than the inner smaller diameter of the drum 2, the flange 35 of the jacket 40 fits snuggly into the remaining space. After having inserted the end cap 14 to engage the stop and after having inserted the jacket 30 onto the end cap 14 a small portion of the end edge 12 of the drum 2 will extend beyond the jacket 30. This remaining portion of the end edge 12 will be crimped to seal and clamp the jacket 30. Additionally, securing means as described above can be utilized to provide a tight connection between the jacket 30 and the crimped portion of the drum 2.

What is claimed is:

1. An electrically driven drum motor comprising:

a substantially cylindrical drum of noncorroding material, in the form of an electrically driven conveyer roller, said drum having annular end edges and being connected with two circular end caps to define, together with these, an internal space to receive an electrical motor, said end caps being provided with a central opening for a rigid shaft for the drum motor each end cap being firmly connected with an external, separate jacket of of noncorroding material;

said jacket having a central opening for the rigid shaft of the drum motor, and said jacket being formed as a circular disc of a relatively thin plate which is formed integrally with a peripheral flange; and said flange being formed to tightly engage an end edge of the cylindrical drum and to form a smooth transition to the external surface of the cylindrical drum.

2. The electrical driven drum motor according to claim 1, wherein:

the end caps are made of aluminum, steel or plastic.

3. The electrically driven drum motor according to 2 wherein:

each end cap has an annular projection which engages a portion of an end edge of the cylindrical drum.

4. The electrically driven drum motor according to claim 2 wherein:

the jackets are made from a plane disc and are provided with an annular shoulder at the central opening.

5. The electrically driven drum motor according to claim 2 wherein:

the jackets are applied to the end caps as a press fit and secured by securing means, said securing means providing a tight connection between the jackets and the end caps.

6. The electrically driven drum motor according to claim 1 wherein:

each end cap has an annular projection which engages a portion of an end edge of the cylindrical drum.

7. The electrically driven drum motor according to claim 6, wherein:

the dimensions of the jackets, the end caps and the cylindrical drum are adjusted to ensure the smooth transition between the outer surface of the flange and the external surface of the cylindrical drum so as to obviate projecting edges or the like on the surface of the drum motor where impurities may accumulate.

8. The electrically driven drum motor according to claim 6 wherein:

the jackets are made from a plane disc and are provided with an annular shoulder at the central opening.

9. The electrically driven drum motor according to claim 6 wherein:

the jackets are applied to the end caps as a press fit and secured by securing means, said securing means providing a tight connection between the jackets and the end caps.

10. The electrically driven drum motor according to claim 1 wherein:

the jackets are made from a plane disc and are provided with an annular shoulder at the central opening.

11. The electrically driven drum motor according to claim 10 wherein:

the jackets are applied to the end caps as a press fit and secured by securing means, said securing means providing a tight connection between the jackets and the end caps.

12. The electrically driven drum motor according to claim 1 wherein:

the jackets are applied to the end caps as a press fit and secured by securing means, said securing means providing a tight connection between the jackets and the end caps.

13. An electrically driven drum motor comprising:

a substantially cylindrical drum of noncorroding material, in the form of an electrically driven conveyer roller, said drum having annular end edges and being connected with two circular end caps to define, together with these, an internal space to receive an electrical motor, said end caps being provided with a central opening for a rigid shaft for the drum motor;

each end cap being firmly connected with an external, separate jacket of of noncorroding material;

said jacket having a central opening for the rigid shaft of the drum motor, and said jacket being formed as a circular disc of a relatively thin plate which is formed integrally with a peripheral flange; and, said flange being arranged between the end edge of the cylindrical drum and the end cap whereby a small portion of the end edge extending beyond the jacket is crimped to seal and clamp the jacket.

14. The electrical driven drum motor according to claim 13, wherein:

the end caps are made of aluminum, steel or plastic.

15. The electrically driven drum motor according to 14 wherein:

each end cap has an annular projection which engages a portion of an end edge of the cylindrical drum.

16. The electrically driven drum motor according to claim 15, wherein:

the dimensions of the jackets, the end caps and the cylindrical drum are adjusted to ensure the smooth transition between the outer surface of the flange and the external surface of the cylindrical drum so as to obviate projecting edges or the like on the surface of the drum motor where impurities may accumulate.

17. The electrically driven drum motor according to claim 14 wherein:

the jackets are made from a plane disc and are provided with an annular shoulder at the central opening.

18. The electrically driven drum motor according to claim 14 wherein:

the jackets are applied to the end caps as a press fit and secured by securing means, said securing means providing a tight connection between the jackets and the end caps.

* * * * *

UNITED STATES PATENT AND TRADEMARK OFFICE
CERTIFICATE OF CORRECTION

PATENT NO   :   6,124,656
DATED       :   September 26, 2000
INVENTOR(S) :   Jan Jensen It is certified that error appears in the above-identified patent and that said Letters Patent is hereby corrected as shown below:

Assignee: "Interroll Holding AG, San Antonio/Ti, China" should read --Interroll Holding AG, San Antonio/Ti, Switzerland--.

Signed and Sealed this

Eighth Day of May, 2001

Attest:

NICHOLAS P. GODICI

Attesting Officer       Acting Director of the United States Patent and Trademark Office